(12) United States Patent
Marriott et al.

(10) Patent No.: US 8,078,685 B2
(45) Date of Patent: Dec. 13, 2011

(54) REMOTELY CONFIGURED MEDIA DEVICE (75) Inventors: Greg Marriott, Honolulu, HI (US); Andrew Bert Hodge, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/047,082

(22) Filed: Mar. 14, 2011

(65) Prior Publication Data

US 2011/0167140 A1 Jul. 7, 2011

Related U.S. Application Data (63) Continuation of application No. 11/583,327, filed on Oct. 18, 2006, now Pat. No. 7,930,369.

(60) Provisional application No. 60/728,671, filed on Oct. 19, 2005.

(51) Int. Cl.
*G06F 15/16* (2006.01)

(52) U.S. Cl. ......... 709/208; 709/203; 709/220; 709/248

(58) Field of Classification Search .................. 709/203, 709/208, 220, 248; 700/94
See application file for complete search history.

(56) References Cited

U.S. PATENT DOCUMENTS

| | | | |
|---|---|---|---|
| 6,611,201 B1 | 8/2003 | Bishop et al. | |
| 7,010,365 B2 | 3/2006 | Maymudes | |
| 7,076,561 B1 | 7/2006 | Rosenberg et al. | |
| 7,593,782 B2 * | 9/2009 | Jobs et al. | 700/94 |
| 7,627,808 B2 * | 12/2009 | Blank et al. | 709/208 |
| 7,673,083 B2 | 3/2010 | Laefer et al. | |
| 7,735,012 B2 | 6/2010 | Naik | |
| 7,827,259 B2 | 11/2010 | Heller et al. | |
| 2001/0037367 A1 | 11/2001 | Iyer | |
| 2002/0189429 A1 | 12/2002 | Qian et al. | |
| 2003/0007001 A1 | 1/2003 | Zimmerman | |
| 2003/0014767 A1 | 1/2003 | Stumphauzer et al. | |
| 2003/0079038 A1 | 4/2003 | Robbin et al. | |
| 2003/0182100 A1 | 9/2003 | Plastina et al. | |
| 2004/0057348 A1 | 3/2004 | Shteyn et al. | |
| 2004/0086120 A1 * | 5/2004 | Akins, III et al. | 380/240 |
| 2004/0103411 A1 | 5/2004 | Thayer | |
| 2004/0252604 A1 | 12/2004 | Johnson et al. | |
| 2005/0045373 A1 | 3/2005 | Born | |
| 2005/0102377 A1 | 5/2005 | King et al. | |
| 2005/0146534 A1 | 7/2005 | Fong et al. | |
| 2005/0149213 A1 * | 7/2005 | Guzak et al. | 700/94 |
| 2005/0159964 A1 | 7/2005 | Sonnenrein et al. | |
| 2005/0160270 A1 | 7/2005 | Goldberg et al. | |
| 2005/0270276 A1 | 12/2005 | Sugimoto et al. | |

(Continued)

OTHER PUBLICATIONS

Office Action dated May 10, 2010 in EP Application No. 06 847 856.9.

*Primary Examiner* — Ramy M Osman
(74) *Attorney, Agent, or Firm* — Womble Carlye Sandridge & Rice LLP (57) ABSTRACT

Improved techniques for controlling operation of a portable electronic device are disclosed. Portable electronic devices which interact with a host electronic device can have their operational settings (e.g., configurations or preferences) remotely controlled. As a result, a host electronic device can offer a more sophisticated user interface and portable electronic devices need less local user interface features because these operational settings can be remotely controlled. The remotely-controlled (i.e., host controlled) operational settings are transferred to the portable electronic devices, whereby the portable electronic devices can thereafter operate in accordance with such settings.

20 Claims, 7 Drawing Sheets

U.S. PATENT DOCUMENTS

| | | |
|---|---|---|
| 2006/0065709 A1 | 3/2006 | Yamashita |
| 2006/0232449 A1 | 10/2006 | Jain et al. |
| 2006/0277336 A1 | 12/2006 | Lu et al. |
| 2007/0049197 A1 | 3/2007 | Klein et al. |
| 2007/0073727 A1 | 3/2007 | Klein et al. |

* cited by examiner

REMOTELY CONFIGURED MEDIA DEVICE

CROSS-REFERENCE TO RELATED APPLICATIONS

This application is a continuation of co-pending U.S. patent application Ser. No. 11/583,327, filed on Oct. 18, 2006, and entitled "REMOTELY CONFIGURED MEDIA DEVICE," which claims priority benefit of U.S. Provisional Application No. 60/728,671, filed Oct. 19, 2005, and entitled "REMOTELY CONFIGURED MEDIA DEVICE," both of which are hereby incorporated herein by reference in their entirety.

BACKGROUND OF THE INVENTION

1. Field of the Invention

The present invention relates to media devices and, more particularly, to configuration of media devices.

2. Description of the Related Art

Today, portable media devices, such as Personal Digital Assistants (PDAs) or hand-held media players, are battery powered and include various user interface components, such as displays and switches/buttons. Conventionally, portable media devices use buttons, dials or touchpads together with graphical user interfaces to control the devices, including setting of user preferences for use by the devices. These portable media devices continue to get smaller and more portable. At the same time, the functionality supported by portable media devices is increasing. Consequently, as portable media devices get smaller while supporting robust functionality, there are increasing difficulties in providing adequate user interfaces for the portable media devices.

Accordingly, there is a need for improved user interface capabilities for portable media players.

SUMMARY OF THE INVENTION

The invention relates to improved techniques for controlling operation of a portable electronic device. According to the invention, portable electronic devices which interact with a host electronic device can have their operational settings (e.g., configurations or preferences) remotely controlled. As a result, a host electronic device can offer a more sophisticated user interface and portable electronic devices need less local user interface features because these operational settings can be remotely controlled. The remotely-controlled (i.e., host controlled) operational settings are transferred to the portable electronic devices, whereby the portable electronic devices can thereafter operate in accordance with such settings.

The invention can be implemented in numerous ways, including as a method, system, device, apparatus, or computer readable medium. Several embodiments of the invention are discussed below.

As a method for remotely providing operational settings from a host electronic device to a client electronic device, the host electronic device having a display, one embodiment of the invention includes at least the acts of: presenting a user interface on the display of the host electronic device, the user interface permitting a user of the host electronic device to select operational settings for use with the client electronic device; receiving a user selection of at least one operational setting for the client electronic device, the user selection being from the user while interacting with the user interface on the host electronic device; and transferring the at least one operational setting from the host electronic device to the client electronic device, whereby the client electronic device stores the at least one operational setting and thereafter operates in accordance with the stored at least one operational setting.

As a method for operating a portable media player in accordance with operational settings, one embodiment of the invention includes at least the acts of: receiving operational settings data from a host computer over a data link between the portable media player and the host computer; storing the operational settings data at the portable media player; and operating a media management application on the portable media player in accordance with the stored operational settings data.

As a computer readable medium including at least computer program code for remotely providing operational settings from a host device to a client device, one embodiment of the invention includes at least: computer program code for presenting a user interface on a display of the host device, the user interface permitting a user of the host device to select operational settings for use with the client device; computer program code for receiving a user selection of at least one operational setting for the client device, the user selection being from the user while interacting with the user interface on the host device; and computer program code for transferring the at least one operational setting from the host device to the client device, whereby the client device stores the at least one operational setting and thereafter operates in accordance with the stored at least one operational setting.

As a computer readable medium including at least computer program code for operating a portable media player in accordance with operational settings, one embodiment of the invention includes at least: computer program code for receiving operational settings data from a host computer over a data link between the portable media player and the host computer; computer program code for storing the operational settings data at the portable media player; and computer program code for operating a media management application on the portable media player in accordance with the stored operational settings data.

As a portable media player for storing and presenting media assets, one embodiment of the invention includes at least: an input/output interface that provides a data connection with a remote computing device; at least one data storage device that stores the media assets and operational settings data, the media assets and the operational settings data being provided over the data connection from the remote computing device; and a media management application that presents one or more of the media assets in accordance with the operational settings data.

As a media system, one embodiment of the invention includes a host computer for storing and presenting host media assets, and a client media player for storing and presenting client media assets. The host computer includes at least: a host input/output interface that provides connection with the client media player; a host media management application that (i) enables a user of the host computer to set user preferences to be used on the client media player, and (ii) transfers one or more of the host media assets from the host computer to become the client media assets at the client media player; and at least one host data storage device that stores the host media assets and the user preferences for the client media player, the user preferences being set by a user of the host computer using the media management application. The client media player includes at least: a client input/output interface that provides connection with the host computer; at least one client data storage device that stores the client media assets and the user preferences, the user preferences being provided over the connection from the host computer; and a client media management application that presents one or more of the client media assets at the client media player in accordance with the user preferences.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques for controlling operation of a portable electronic device. According to the invention, portable electronic devices which interact with a host electronic device can have their operational settings (e.g., configurations or preferences) remotely controlled. As a result, a host electronic device can offer a more sophisticated user interface and portable electronic devices need less local user interface features because these operational settings can be remotely controlled. The remotely-controlled (i.e., host controlled) operational settings are transferred to the portable electronic devices, whereby the portable electronic devices can thereafter operate in accordance with such settings.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
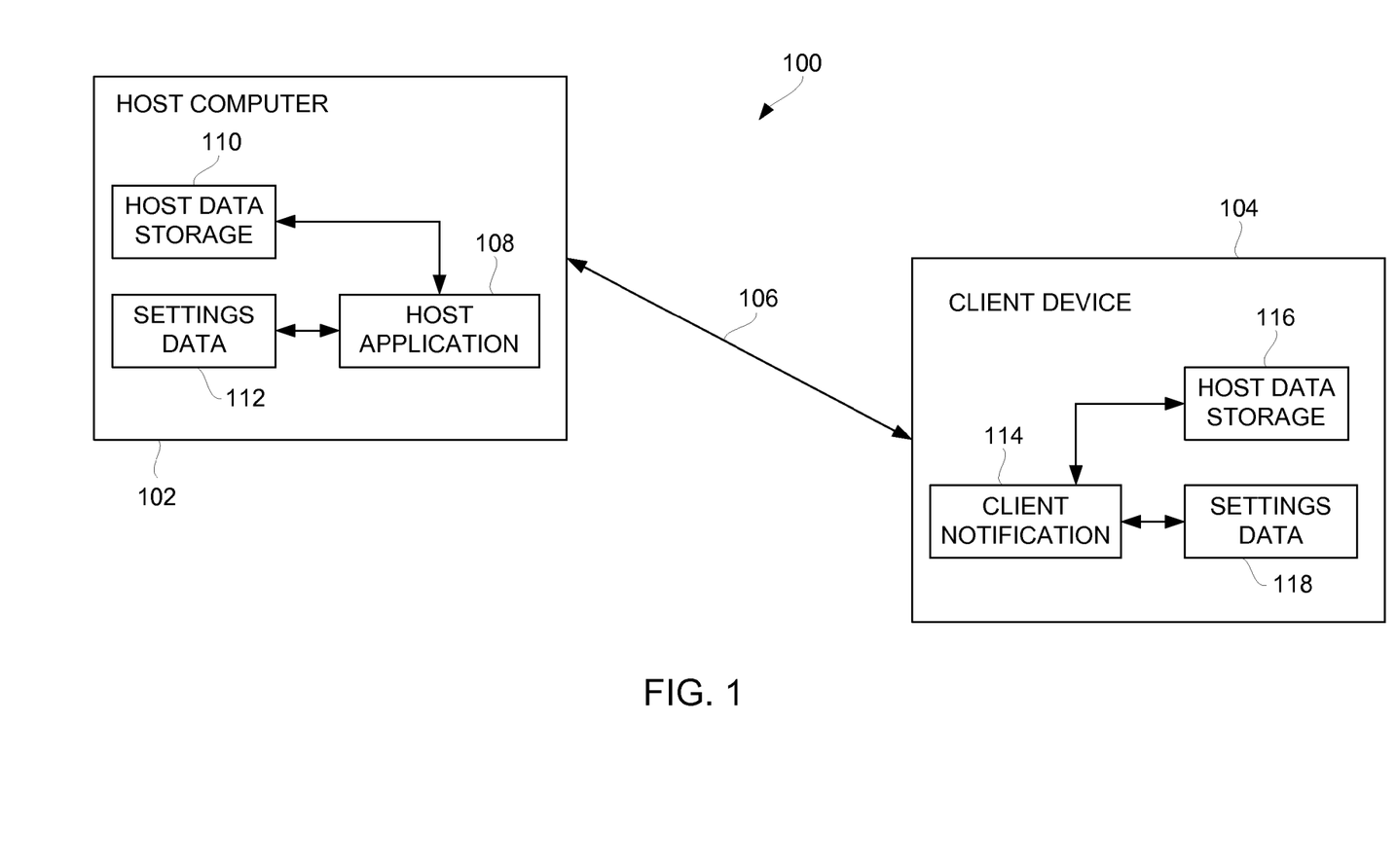
FIG. 1 is a block diagram of a settings management system according to one embodiment of the invention.

FIG. 1 is a block diagram of a settings management system 100 according to one embodiment of the invention. The settings management system 100 includes a host computer 102 and a client device 104. The host computer 102 is able to communicate with the client device 104 over a data link 106. The data link 106 can be provided over a wired network, a wireless network, or both.

The host computer 102 includes a host application 108. The host application 108 can represent an application program that is operable on the host computer 102. As an example, the host application 108 can be a media management application. One particular example of a media management application is iTunes® media management application provided by Apple Inc. The host computer 102, among other things, also includes a host data storage 110 and settings data 112. The host data storage 110 stores the data for the host computer 102. The data stored in the host data storage 110 is typically utilized by the host application 108. For example, when the host application 108 is or includes a media management application, the host data can pertain to media data, such as media data pertaining to media items. The settings data 112 can be managed by the host application 108. The settings data 112 pertains to data that controls or sets one or more operational settings on the client device 104. The operational settings, for example, can include user preferences or configurations. Operational settings can also be referred to as options. The settings data 112 is determined by the host application 108 in accordance with user interaction with the user interface provided by the host application 108.

The client device 104 is typically a highly portable electronic device. As an example, the client device 104 can be a hand-held computing device. More particularly, the client device 104 can be a hand-held media player. The client device 104 includes a client application 114. The client application 114 operates on the client device 104. The client application 114 can, for example, pertain to a media management application that enables the client device 104 to operate as a media player. The client application 114 makes use of client data storage 116 and settings data 118. The client data storage 116 stores data utilized by the client application 114. For example, when the client application 114 is a media management application, the client data being stored in the client data storage 116 can pertain to media data. The client application 114 also makes use of the settings data 118. In one embodiment, the settings data 118 are utilized by the client application 114 to control operational settings that are utilized by the client application 114.

The specific nature of the operational settings being set and utilized varies widely with different client devices. In an exemplary embodiment, such as where the host application 108 and the client application 114 are media management applications operating on a music player, the settings data can pertains to settings such as: shuffle settings, repeat settings, playback speed settings, equalization settings, sound check settings, clicker settings, language settings, menu configuration settings, etc.

Accordingly, a user of the host computer 102 is able to interact with the host application 108 using a user interface to set certain operational settings that will be applied to affect the operation of the client application 114 on the client device 104. In the event that the client device 104 has limited user interface capabilities, the ability to control operational settings (from the client device 104) to be utilized by the client device 104 can be severely hindered. Hence, enabling a user to remotely control operational settings for the client device 104 via a user interface made available at the host computer 102 is advantageous for a variety of reasons. One advantage of this approach is that the host computer 102 can offer an improved user interface that is often larger and more sophisticated than would otherwise be available on the client device 104. Another advantage of this approach is that the need for user interface features at the client device 104 is reduced, thereby allowing the client device 104 to be smaller, lighter and potentially less expensive.

The host computer 102 and the client device 104 can also be referred to as a host electronic device and a client electronic device, respectively. The client device 104 is normally a portable media device. In one embodiment, the form factor of the portable media device is hand-held or smaller. The portable media device may, for example, be small and lightweight enough to be carried in one hand, worn, or placed in a pocket.

To make client devices user-friendly, one approach is to limit the number of user controls. In one embodiment, a client device does not include a display screen. In such cases, the ability for a user of the client device to control settings (e.g., user preferences or other configurations) by way of making selections with respect to a display screen is not possible. With such client devices, the ability to enable users to set user preferences or configurations can be substantially limited. Consequently, the invention advantageously enables user preferences for a client device to be set at a host computer and then transferred to the client device.

Figure 2:
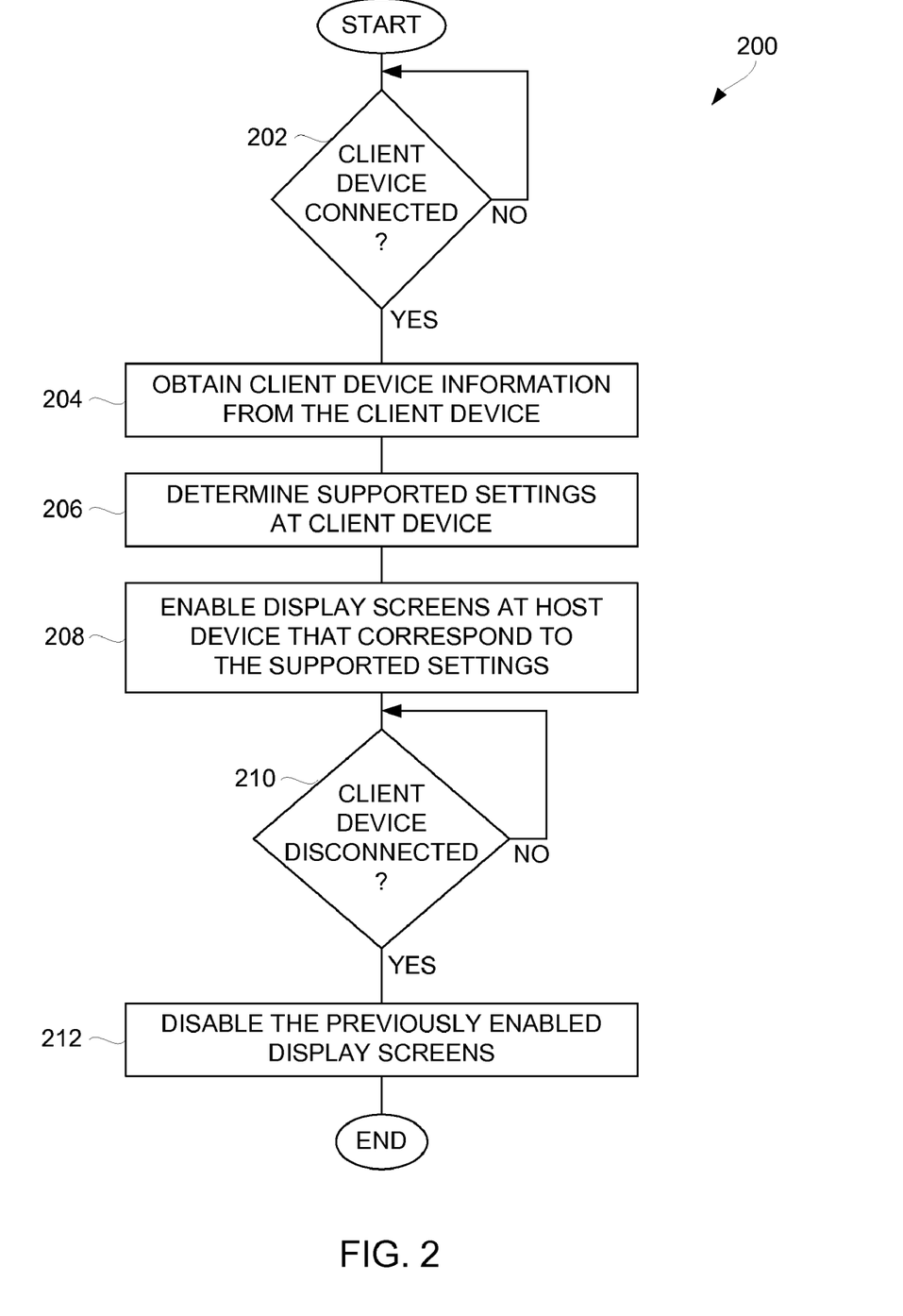
FIG. 2 is a flow diagram of a settings management process according to one embodiment of the invention.

FIG. 2 is a flow diagram of a settings management process 200 according to one embodiment of the invention. The settings management process 200 is, for example, performed by a host device, such as the host computer 102 illustrated in FIG. 1. More specifically, as an example, the host application 108 of the host computer 102 can perform the settings management process 200.

The settings management process 200 begins with a decision 202. The decision 202 determines whether a client device is connected to the host device. When the decision 202 determines that a client device is not connected to the host device, then the settings management process 200 awaits such a connection. In other words, the settings management process 200 can be deemed invoked once a client device is connected to the host device.

Accordingly, when the decision 202 determines that a client device is connected, the settings management process 200 continues. When the settings management process 200 continues, client device information is obtained 204 from the client device. Here, through communications between the host device and the client device, the host computer is able to obtain 204 the client device information that is provided by the client device. The client device information can pertain to various features available at the client device, whether software features or hardware features. The client device information can also include a type indication for the client device. The client device can also provide an identifier for the client device.

Next, the settings management process 200 determines 206 supported settings at the client device. The supported settings at the client device are those settings that the client device can recognize. Next, display screens at the host device are enabled 208. The display screens being enabled 208 are those display screens that correspond to the supported settings. In other words, the display screens that are enabled 208 are all part of a user interface provided at the host device and serves to enable a user of the host device to review or modify one or more operational settings that are supported by the client device.

Thereafter, a decision 210 determines whether the client device has been disconnected from the host device. When the decision 210 determines that the client device has not been disconnected but remains connected, the settings management process 200 continues to enable display of the display screens that correspond to the one or more operational settings that are supported by the client device. However, when the decision 210 determines that the client device has been disconnected, then the previously enabled display screens are disabled 212. Here, once the client device has been disconnected from the host device, the host device typically does not allow the settings for the client device to be modified. As a result, the display screens that would otherwise be utilized by a user of the host device to review and modify the supported operational settings are no longer accessible at the host device. Following the block 212, the settings management process 200 ends. However, in general, the settings management process 200 can be invoked whenever a client device is connected to the host device.

Although the settings management system 100 depicts only a single client device, it should be understood that the settings management system 100 can support a plurality of different client devices. In doing so, the host device 102 is able to individually manage the settings to be utilized by each of the different client devices. In one embodiment, for each of the client devices, a separate settings management process 200 can be invoked and utilized.

Figure 3:
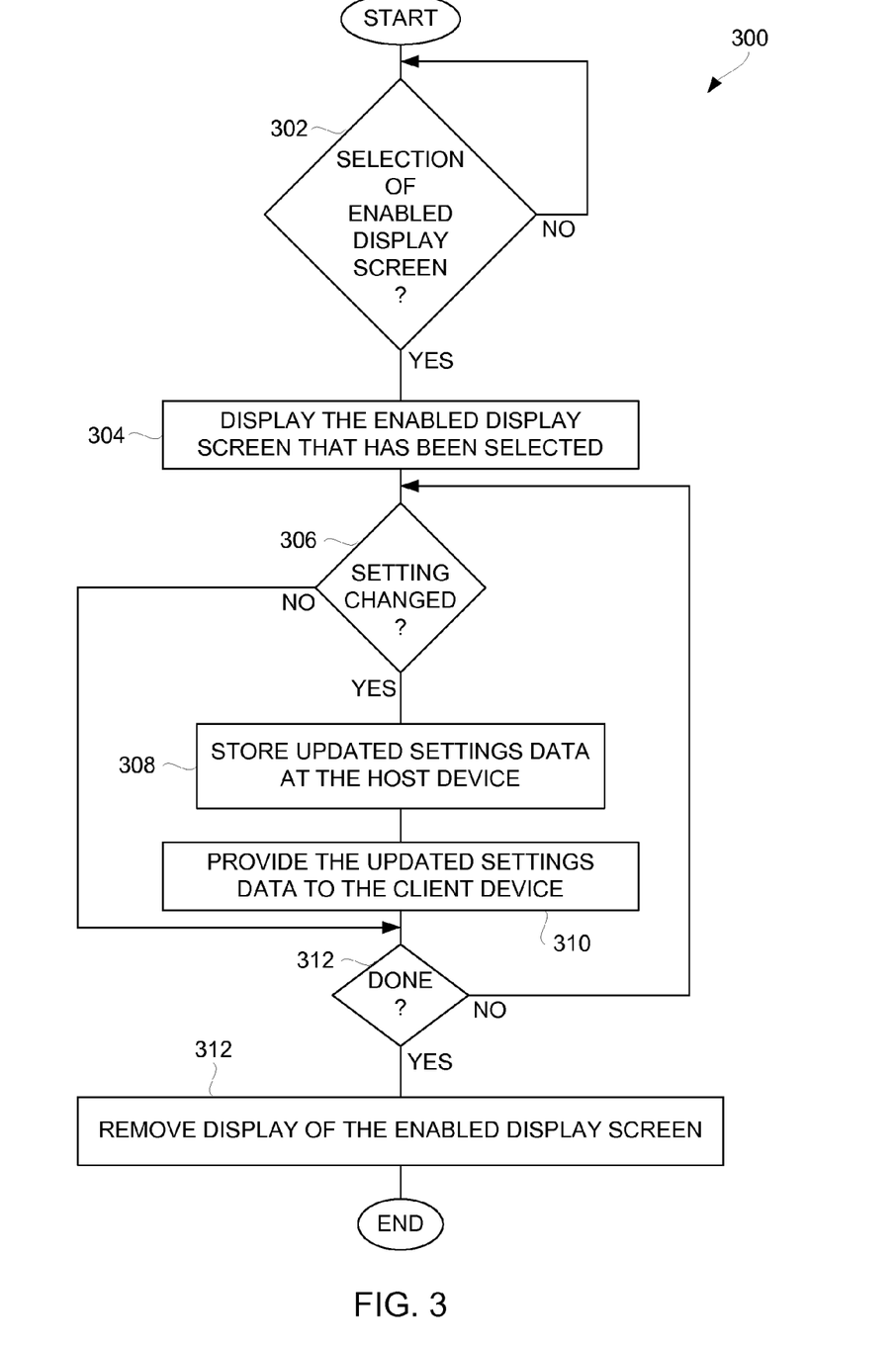
FIG. 3 is a flow diagram of a settings modification process according to one embodiment of the invention.

FIG. 3 is a flow diagram of a settings modification process 300 according to one embodiment of the invention. The settings modification process 300 is, for example, performed by a host device, such as the host computer 102 illustrated in FIG. 1.

The settings modification process 300 begins with a decision 302. The decision 302 determines whether a selection of an enabled display screen has been made. In other words, whether a user of the host device has requested to have the host device display a display screen that can be utilized to modify operational settings of a client device. In order for such a display screen to be presented, the display screen must be currently enabled as discussed above with regard to FIG. 2. For example, the client device must be connected to the host device. In any case, when the decision 302 determines that there has been no selection of an enabled display screen, the settings modification process 300 awaits such a selection. In other words, the settings modification process 300 is effectively invoked when a user has selected an enabled display screen to be presented on the host device.

Once the decision 302 determines that a selection of an enabled display screen has been made, the enabled display screen that has been selected is displayed 304. Next, a decision 306 determines whether the user has interacted with the enabled display screen to change one or more settings pertaining to operation of the client device. When the decision 306 determines that one or more settings have been changed, updated settings data is stored 308 at the host device. The updated settings data includes at least the settings data that has been changed. Typically, the host device will store all of the settings data. Hence, when certain settings data has been changed, the certain settings data is stored so as to replace the previously stored settings data corresponding thereto. Next, the updated settings data is provided 310 to the client device. Typically, the updated settings data is provided 310 to the client device over a data link, such as data link 106 illustrated in FIG. 1. As previously noted, the data link can pertain to a wired network, a wireless network or both. Here, the updated settings data provided 310 to the client device pertains to at least the settings that have been changed. Alternatively, all of the settings data can be provided 310 to the client device and thereby replace all of the settings data at the client device. On the other hand, when the decision 306 determines that the settings have not been changed, the settings modification process 300 bypasses the blocks 308 and 310.

After the updated settings data has been provided 310 to the client device (or after blocks 308 and 310 are bypassed), a decision 312 determines whether the settings modification process 300 is done. When the user has completed making any changes to settings data, the settings modification process 300 can be manually or automatically determined to be done. Regardless, when the decision 312 determines that the settings modification process 300 is not done, the settings modification process 300 returns to repeat the decision 306 and subsequent operations.

Once the decision 312 determines that the settings modification process 300 is done, then display of the enabled display screen is removed 314. Thereafter, the settings modification process 300 is complete and ends.

Figure 4A:
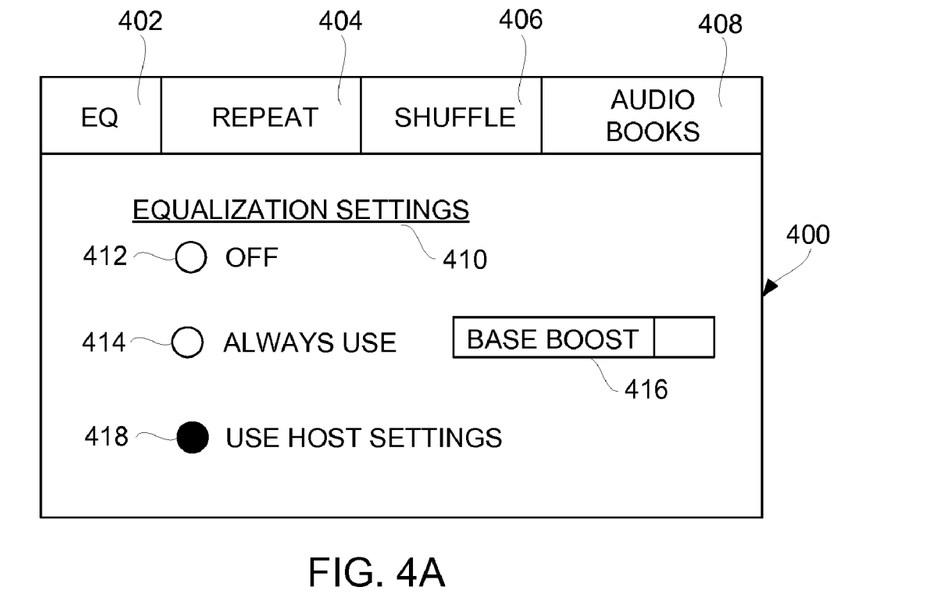
FIG. 4A is an exemplary diagram of a settings modification screen according to one embodiment of the invention.

FIG. 4A is an exemplary diagram of a settings modification screen 400 according to one embodiment of the invention. The settings modification screen 400 represents a display screen that can be utilized to modify operational settings of a client device (e.g., block 304 of FIG. 3). In this embodiment, the settings modification screen 400 pertains to a display screen provided by a media management application. The settings modification screen 400 includes tab selectors 402, 404, 406 and 408. The tab selector 402 pertains to equalization settings, the tab selector 404 pertains to repeat settings, the tab selector 406 pertains to shuffle settings, and the tab selector 408 pertains to audio books. As depicted in FIG. 4A, the settings modification screen 400 pertains to an equalization settings screen, since the tab selector 402 has been chosen. As such, the settings modification screen 400 depicts equalization settings 410. A user can thus interact with the settings modification screen 400 to make choices as to how a client device is to operate with regards to equalization. In this embodiment, the equalization settings 410 available on the settings modification screen 400 present a user with three choices for selection. The three choices can be selected by selectors 412, 414 and 418. The selector 412 allows a user to select "Off" if no equalization operations are desired at the client device. The selector 414 allows the user to select "Always Use" to utilize a predetermined equalization setting. A selector 416 allows the user to select one of a plurality of preset equalization settings to be used as the predetermined equalization setting in the case where the selector 414 is selected. In the example illustrated in FIG. 4A, the selected predetermined equalization setting is known as "Bass Boost". The selector 418 allows the user to select "Use Host Settings" to utilize host equalization settings. For example, with respect to FIG. 1, the host application 108 can allow a user of the host computer 102 to set equalization settings for media items available at the host computer 102. The selection of the selector 418 indicates that the user desires to utilize the same equalization settings automatically on the client device 104. In such case, the equalization settings can be set in a variety of different ways at the host computer 102. For example, for any type of genre, artist, album or media item (e.g., song, video, etc.), the equalization settings can be separately determined.

Figure 4B:
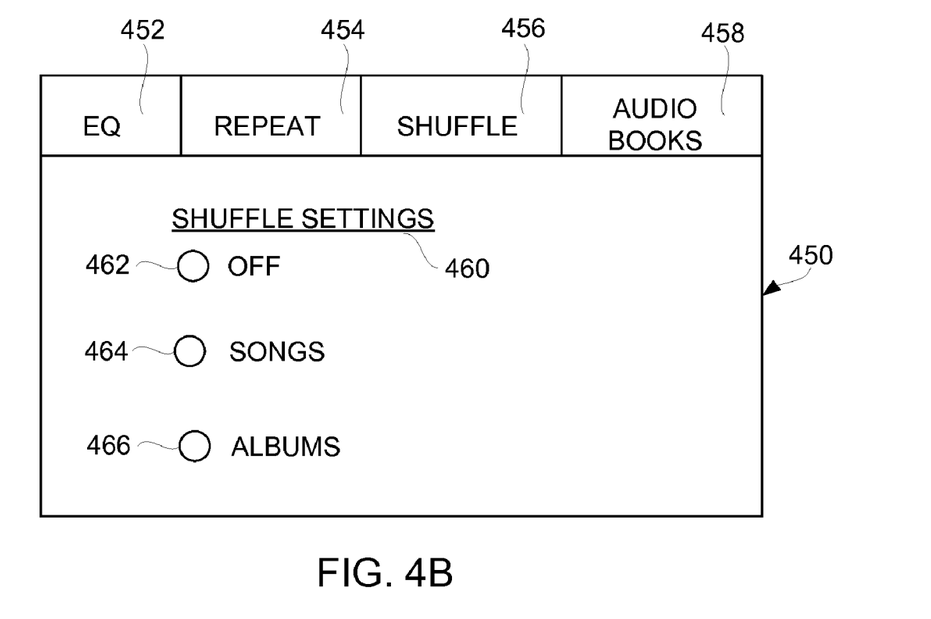
FIG. 4B is an exemplary diagram of another settings modification screen according to one embodiment of the invention.

FIG. 4B is an exemplary diagram of another settings modification screen 450 according to one embodiment of the invention. The settings modification screen 450 represents a display screen that can be utilized to modify operational settings of a client device (e.g., block 304 of FIG. 3). In this embodiment, the settings modification screen 450 pertains to a display screen provided by a media management application. The settings modification screen 450 includes tab selectors 452, 454, 456 and 458. The tab selector 452 pertains to equalization settings, the tab selector 454 pertains to repeat settings, the tab selector 456 pertains to shuffle settings, and the tab selector 458 pertains to audio books. As depicted in FIG. 4B, the settings modification screen 450 pertains to a shuffle settings 460, since the tab selector 456 has been chosen. The shuffle settings 460 allows the user to indicate whether and what type of shuffle they desire to be utilized with the client device. In this example, the user is presented with three options for shuffle settings 460. The first settings option is "Off" and corresponds to a selector 462. When selected, the client device would not provide any shuffle operation. The second settings option is "Songs" and corresponds to a selector 464. When selected, the client device would shuffle a play order of songs on a song basis after playing through all (or a playlist of) the songs. The third settings option is "Albums" and corresponds to a selector 466. When selected, the client device would shuffle a play order of songs on an album basis (e.g., after playing all the songs within an album).

Figure 5:
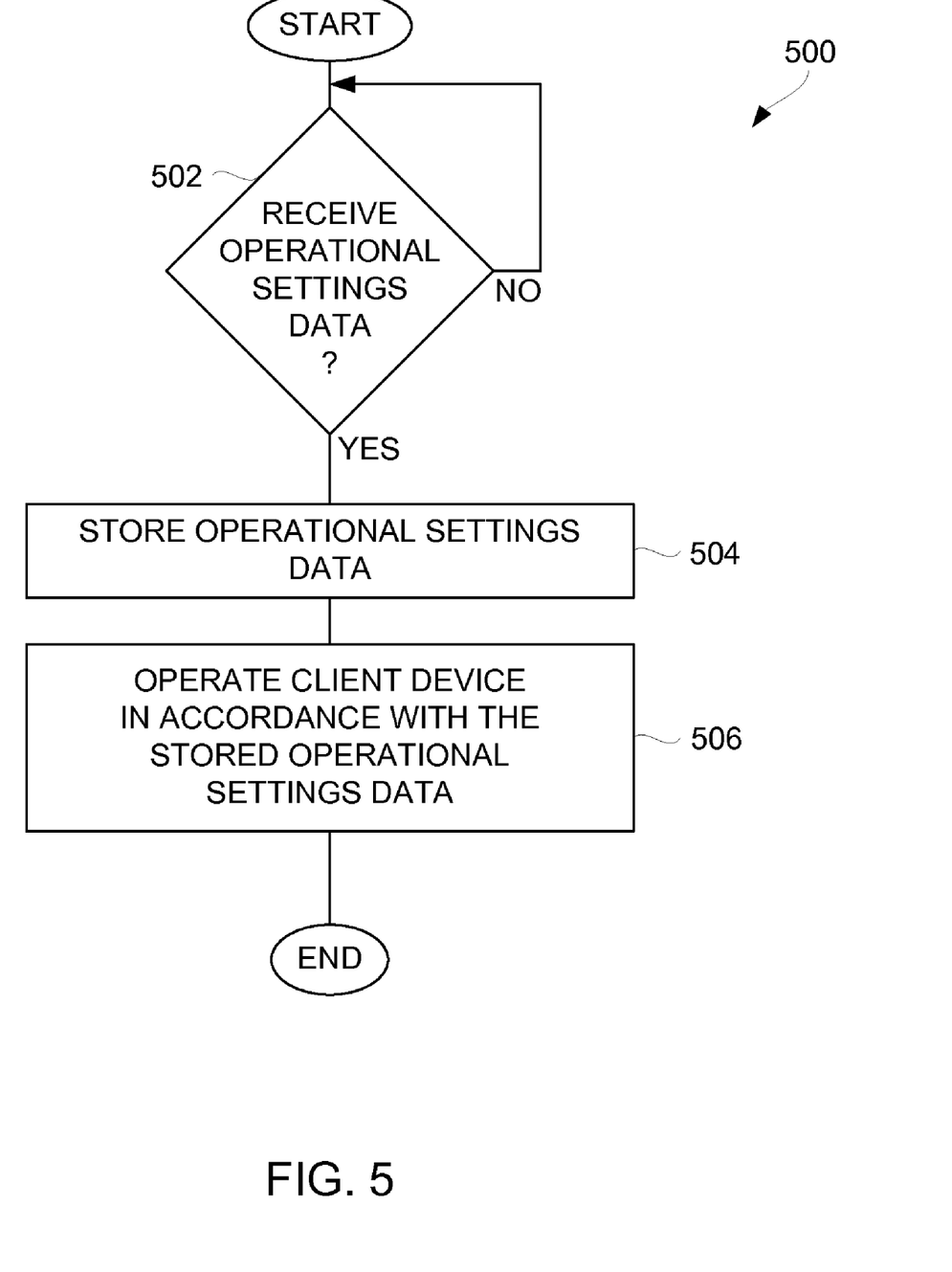
FIG. 5 is a flow diagram of a settings utilization process according to one embodiment of the invention.

FIG. 5 is a flow diagram of a settings utilization process 500 according to one embodiment of the invention. The settings utilization process 500 is, for example, performed by a client device, such as the client device 104 illustrated in FIG. 1. More specifically, as an example, the client application 114 of the client computer 104 can perform the settings utilization process 500. In one example, the client application is a media management application.

The settings utilization process 500 begins with a decision 502. The decision 502 determines whether operational settings data has been received 502. As noted above with respect to the settings modification process 300 illustrated in FIG. 3, operational settings data can be set at a host computer and transferred to a client device. For example, in FIG. 3, updated settings data can be provided 310 to the client device. In any case, when the decision 502 determines that operational settings data has not been received, then the settings utilization process 500 awaits such data.

Once the decision 502 determines that operational settings data has been received, the operational settings data is stored 504 at the client device. As noted above in FIG. 1, the client device can include data storage, such as the client data storage 116. Thereafter, the client device can be operated 506 in the normal course in accordance with the stored operational settings data. In other words, the client device can make use of operational settings data that has been set at a host computer, yet utilized on the client computer. For example, although the operational settings data is remotely determined and then provided to the client device, the client device can make use of the operational settings data as if it had been provided locally. In one embodiment, all or substantially all of the available operational settings for the client device can be set at the host computer. In another embodiment, some operational settings can be remotely set at the host computer, while other operational settings can be sent at the client device. In still another embodiment, some or all of the operational settings can be set at either the host computer or the client device. Following the block 506, the settings utilization process 500 is complete and ends.

Figure 6:
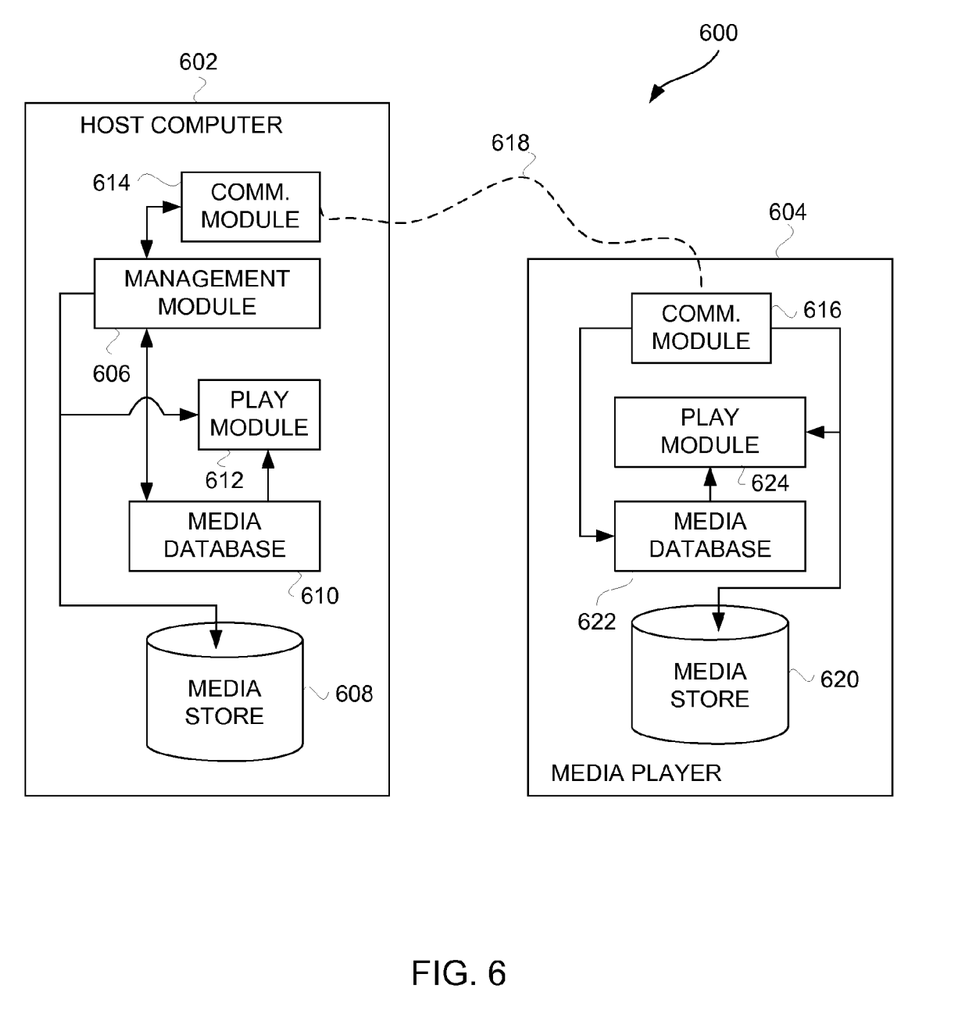
FIG. 6 is a block diagram of a media management system according to one embodiment of the invention.

FIG. 6 is a block diagram of a media management system 600 according to one embodiment of the invention. The media management system 600 includes a host computer 602 and a media player 604. The host computer 602 is, for example, an implementation of the host computer 102 illustrated in FIG. 1. The media player 604 is, for example, an implementation of the client device 104 illustrated in FIG. 1. The host computer 602, among other conventional components, includes a management module 606 which is a software module. The management module 606 provides for centralized management of media items (and/or playlists) not only on the host computer 602 but also on the media player 604. More particularly, the management module 606 manages those media items stored in a media store 608 associated with the host computer 602. The management module 606 also interacts with a media database 610 to store media information associated with the media items stored in the media store 608.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items.

Examples of quality characteristics of media items can include one or more of: bit rate, sample rate, equalizer setting, volume adjustment, start/stop and total time.

Still further, the host computer 602 includes a play module 612. The play module 612 is a software module that can be utilized to play certain media items stored in the media store 608. The play module 612 can also display (on a display screen) or otherwise utilize media information from the media database 610. Typically, the media information of interest corresponds to the media items to be played by the play module 612.

The host computer 602 also includes a communication module 614 that couples to a corresponding communication module 616 within the media player 604. A connection or link 618 removably couples the communication modules 614 and 616. In one embodiment, the connection or link 618 is a cable that provides a data bus, such as a FIREWIRE™ bus or USB bus, which is well known in the art. In another embodiment, the connection or link 618 is a wireless channel or connection through a wireless network. Hence, depending on implementation, the communication modules 614 and 616 may communicate in a wired or wireless manner.

The management module 606 can also operate to set operational settings for use on the media player 604. The settings management processing 200 and the settings modification process 300 are examples of processing that might be utilized in this regard. The operational settings (or operational settings data) for use with the client device can be set and then stored on the host computer 602. At the host computer 602, the operational settings (or operational settings data) can, for example, be stored in the media store 608, the media database 610 or other storage. The management module 606 and/or the communication module 614 can also operate to transfer the operational settings (or operational settings data) to the media player 604.

The media player 604 also includes a media store 620 that stores media items within the media player 604. Optionally, the media store 620 can also store data, i.e., non-media item storage. The media items being stored to the media store 620 are typically received over the connection or link 618 from the host computer 602. More particularly, the management module 606 sends all or certain of those media items residing on the media store 608 over the connection or link 618 to the media store 620 within the media player 604. Additionally, the corresponding media information for the media items that is also delivered to the media player 604 from the host computer 602 can be stored in a media database 622. In this regard, certain media information from the media database 610 within the host computer 602 can be sent to the media database 622 within the media player 604 over the connection or link 618. Still further, playlists identifying certain of the media items can also be sent by the management module 606 over the connection or link 618 to the media store 620 or the media database 622 within the media player 604.

Furthermore, the media player 604 includes a play module 624 that couples to the media store 620 and the media database 622. The play module 624 is a software module that can be utilized to play certain media items stored in the media store 620. The play module 624 can also display (on a display screen) or otherwise utilize media information from the media database 622. Typically, the media information of interest corresponds to the media items to be played by the play module 624.

In one embodiment, the media player 604 has limited or no capability to manage media items on the media player 604. However, the management module 606 within the host computer 602 can indirectly manage the media items residing on the media player 604. For example, to "add" a media item to the media player 604, the management module 606 serves to identify the media item to be added to the media player 604 from the media store 608 and then causes the identified media item to be delivered to the media player 604. As another example, to "delete" a media item from the media player 604, the management module 606 serves to identify the media item to be deleted from the media store 608 and then causes the identified media item to be deleted from the media player 604. As still another example, if changes (i.e., alterations) to characteristics of a media item were made at the host computer 602 using the management module 606, then such characteristics can also be carried over to the corresponding media item on the media player 604. In one implementation, the additions, deletions and/or changes occur in a batch-like process during synchronization of the media items on the media player 604 with the media items on the host computer 602.

In another embodiment, the media player 604 has limited or no capability to manage playlists on the media player 604. However, the management module 606 within the host computer 602 through management of the playlists residing on the host computer can indirectly manage the playlists residing on the media player 604. In this regard, additions, deletions or changes to playlists can be performed on the host computer 602 and then be carried over to the media player 604 when delivered thereto.

At the media player 604, the operational settings (or operational settings data) can be received by the communication module 616 and then stored in the media store 620, the media database 622 or other storage. Thereafter, the media player 604, e.g., the play module 624, can utilize the operational settings (or operational settings data) when operating. Optionally, the media player 604 can also enable a user to directly set one or more operational settings. Hence, some operational settings can be set at the host computer 602 and provided to the media player 604, while other operational settings can be set locally at the media player 604. In one embodiment, the media player 604 enables a user to override or alter the operational settings provided by the host computer.

The ability to remotely set operational settings at the host computer 602 and then provide them to the media player 604 can be restricted so as to prevent data exchange when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 7:
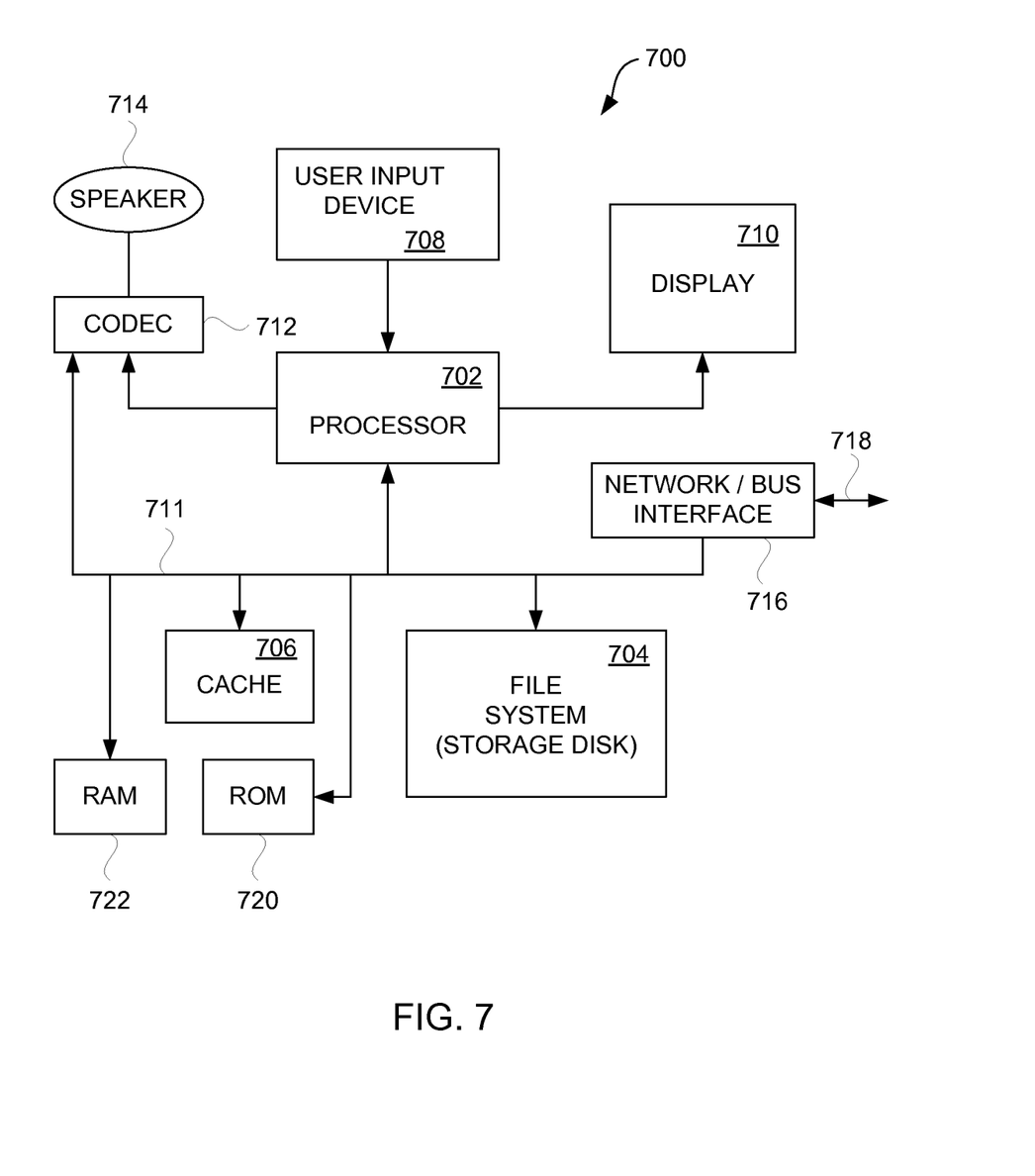
FIG. 7 is a block diagram of a media player according to one embodiment of the invention.

FIG. 7 is a block diagram of a media player 700 according to one embodiment of the invention. The media player 700 includes a processor 702 that pertains to a microprocessor or controller for controlling the overall operation of the media player 700. The media player 700 stores media data pertaining to media items in a file system 704 and a cache 706. The file system 704 is, typically, a storage disk or a plurality of disks. The file system 704 typically provides high capacity storage capability for the media player 700. The file system 704 can store not only media data but also non-media data (e.g., when operated in a disk mode). However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the media player 700 is a portable media player that is powered by a battery (not shown). The media player 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The media player 700 also includes a user input device 708 that allows a user of the media player 700 to interact with the media player 700. For example, the user input device 708 can take a variety of forms, such as a button, keypad, dial, etc. Still further, the media player 700 includes a display 710 (screen display) that can be controlled by the processor 702 to display information to the user. A data bus 711 can facilitate data transfer between at least the file system 704, the cache 706, the processor 702, and the CODEC 712.

In one embodiment, the media player 700 serves to store a plurality of media items (e.g., songs) in the file system 704. When a user desires to have the media player play a particular media item, a list of available media items is displayed on the display 710. Then, using the user input device 708, a user can select one of the available media items. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media player 700 or external to the media player 700. For example, headphones or earphones that connect to the media player 700 would be considered an external speaker.

The media player 700 also includes a network/bus interface 716 that couples to a data link 718. The data link 718 allows the media player 700 to couple to a host computer. The data link 718 can be provided over a wired connection or a wireless connection. In the case of a wireless connection, the network/bus interface 716 can include a wireless transceiver.

The media items (or media assets) can be audio items (e.g., audio files or songs), videos (e.g., movies) or images (e.g., photos).

In one embodiment, the client device/media player is a portable media device dedicated to processing media such as audio, video and/or images. For example, the media device can be a music player (e.g., MP3 player), a game player, a video player, a video recorder, a camera, an image viewer and the like. These devices are generally battery operated and highly portable so as to allow a user to listen to music, play games or video, record video, play video, take pictures or view pictures wherever the user travels. In one implementation, the media device is a hand-held device that is sized for placement into a pocket or hand of the user. By being hand-held, the media device is relatively small and easily handled and utilized by its user. By being pocket sized, the user does not have to directly carry the media device and therefore the media device can be taken almost anywhere the user travels. Furthermore, the media device may be operated by the user's hands without the need for a reference surface such as a desktop.

In general, the media player can correspond to one or more of: a music player, game player, video player, camera, mobile telephone (e.g., cell phone), personal digital assistant (PDA), and/or the like.

U.S. application Ser. No. 11/535,646, (now U.S. Pat. No. 7,706,637) filed Sep. 27, 2006, and entitled "HOST CONFIGURED FOR INTEROPERATION WITH COUPLED PORTABLE MEDIA PLAYER DEVICE," is hereby incorporated herein by reference. U.S. application Ser. No. 10/973,925, (now U.S. Pat. No. 7,680,849) filed Oct. 25, 2004, and entitled "MULTIPLE MEDIA TYPE SYNCHRONIZATION BETWEEN HOST COMPUTER AND MEDIA DEVICE," is hereby incorporated herein by reference.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that operational settings to be utilized by a client device (e.g., portable media device) can be remotely set at a host computer. This avoids or reduces the need for the client device to support user interaction to set such operational settings. A host computer can also offer a user interface for controlling operational settings that is often larger and more sophisticated than would otherwise be available on a client device.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for remotely providing operational settings from a host device to a client media device, the host device having a display, the method comprising:
   determining, at the host device, operational settings supported by the client media device;
   enabling, at the host device, display screens that correspond only to operational settings supported by the client media device, wherein the display screens present user interfaces presenting a list of selectable operational settings for the client media device, wherein the client media device lacks an interface for altering the operational settings;
   receiving a user selection of at least one operational setting for the client media device;
   causing the client media device to persistently run using the user-selected operational setting, until the host device is utilized to alter the user-selected operational setting; and
   terminating a communication link between the host device and the client media device once the client media device is caused to persistently run using the user-selected operational setting, wherein when the client electronic device and the host device are physically separated from one another, the client media device operates independent of the host device in accordance with the user-selected operational setting.

2. The method of claim 1, further comprising receiving client media device information from the client media device.

3. The method of claim 2, wherein the client media device information pertains to software features available at the client media device.

4. The method of claim 2, wherein the client media device information pertains to hardware features available at the client media device.

5. The method of claim 2, wherein the client media device information includes a type indication for the client media device.

6. The method of claim 2, wherein the client media device information includes an identifier for the client media device.

7. A host device comprising:
   a display;
   a communications interface capable of communicatively coupling the host device with a client media device;
   a settings management process designed to determine operational settings supported by the client media device, wherein the client media device lacks an interface for altering the operational settings;
   a user interface designed to:
      display a list of selectable operational settings on the display, wherein the list of selectable operational settings comprise only those operational settings determined to be supported by the client media device;
      receive a user selection of at least operational setting for the client media device;
      cause the client media device to persistently run using the user-selected operational setting, until the host device is utilized to alter the user-selected operational setting; and
      terminate a communication link between the host device and the client media device once the client media device is caused to persistently run using the user-selected operational setting, wherein when the client electronic device and the host device are physically separated from one another, the client media device operates independent of the host device in accordance with the user-selected operational setting.

8. The host device of claim 7, wherein the user interface is designed to cause the client media device to persistently run using the user-selected operational setting by transmitting the user-selected operational setting to the client media device when the client media device is connected to the host device.

9. The host device of claim 7, wherein the client media device is a portable media player.

10. The host device of claim 7, wherein the user interface is part of a media management application.

11. The host device of claim 7, wherein the at least one operational setting of the client media device is one of an equalization setting, a repeat setting, a shuffle setting or a playback speed setting.

12. A media system comprising:
   a host computer for storing and presenting host media assets, the host computer in communication with a client media player over a communication link established to transfer data between the host computer and client media player, wherein the client media player lacks an interface for altering operational settings;
   wherein the host computer includes:
      an interface for establishing a communication link with the client media player; and
      a media management application that detects available operational settings at the client media player when the client media player is connected to the interface, provides a menu allowing a user to select only from the available operational settings, receives input from the user indicating one of the available operational settings to modify, transmits the selected operational setting to the client media player over the communication link, and terminates the communication link between the host device and the client media device after the operational setting is transmitted, wherein when the client electronic device and the host device are physically separated from one another, the client media device operates independent of the host device in accordance with the selected operational setting.

13. The media system of claim 12, further comprising:
   wherein the client media player is designed to:
      receive the selected operational setting from the media management application of the host computer;
      persistently store the selected operational setting and operate using the selected operational setting until the selected operational setting is changed.

14. The media system of claim 13, wherein the operational setting is persistent at the client media player even after the client media player is disconnected from the host computer.

15. The media system of claim 12, wherein the interface is a wireless interface.

16. A non-transitory computer readable medium including at least computer program code for remotely providing operational settings from a host device to a client media device, said computer readable medium comprising:
   computer program code for receiving information at the host device about available operational settings on the client media device, wherein the client media device lacks an interface for altering the operational settings;
   computer program code for providing a user interface having selectable operational settings including only the available operational settings;
   computer program code for receiving a user selection of at least one operational setting for the client media device;
   computer program code for transferring the at least one operational setting from the host electronic device to the client media device over a communication link, wherein the client media device stores the at least one operational setting; and
   computer program code for terminating the communication link between the host device and the client media device at the completion of the transferring, wherein when the client electronic device and the host device are physically separated from one another, the client media device operates independent of the host device in accordance with the stored at least one operational setting.

17. The non-transitory computer readable medium of claim 16, wherein the at least one operational setting is a sound check setting.

18. The non-transitory computer readable medium of claim 16, wherein the at least one operational setting is a clicker setting.

19. The non-transitory computer readable medium of claim 16, wherein the at least one operational setting is a language setting.

20. The non-transitory computer readable medium of claim 16, wherein the at least one operational setting is a menu configuration setting.

* * * * *